UNITED STATES PATENT OFFICE.

DAVID J. OGILVY, OF CINCINNATI, OHIO.

ROSIN-OIL.

SPECIFICATION forming part of Letters Patent No. 324,878, dated August 25, 1885.

Application filed September 29, 1884. (No specimens.)

*To all whom it may concern:*

Be it known that I, DAVID J. OGILVY, a citizen of the United States, residing at Cincinnati, Ohio, have invented new and useful Improvements in Rosin-Oil, of which the following is a specification.

My invention relates to improvements in rosin-oils for industrial purposes; and it consists in combining with the crude, commercial, or "redistilled" oils potassium or sodium hydroxide or the weak alkaline salts of potassium or sodium hydroxide, or both—such as carbonate, bicarbonate, &c.—by which alkalies the rosin-oil acids are wholly or partially neutralized, whereby certain beneficial properties are conferred upon the product, as more fully hereinafter described.

The ordinary rosin-oils of commerce are prepared by distilling crude rosins, and are light-colored heavy oils, which can afterward be redistilled and oils of various specific gravity produced, all of complex chemical structure and but little understood. It is also possible to obtain varying grades of oil from the rosin direct with fractional distillation or similar means. These are extensively used in mixing with lubricants, manufacturing paints, printing-inks, &c. My product possesses something of the character of linseed-oil, and can be substituted for the latter in many industrial compounds, whereby the cost of the same is reduced, and the quality and desirable properties are preserved.

In carrying out my invention I mix with the oil from one and one-half to two and one-half per cent., by weight, of commercial caustic soda, preferably dissolved in water, and heat the mixture until all the water is expelled. The amount of water is immaterial, only sufficient being used to dissolve the alkali or salt employed. If potash is used, the quantity must be increased in proportion with its greater chemical equivalent. Similarly other salts of sodium or potassium—such as carbonate, bicarbonate, &c.—may be used, or any soda or potash salt in which the alkali can neutralize the resinous acids. Such salts as nitrates, sulphates, chlorides, &c., I have found impracticable.

The alkali remains distributed and dissolved in the mixture in chemical combination with the acids therein, and gives the mass its desirable properties. It is usually advisable to make a test experiment, using the grade of oil to be treated, as no exact rule can be laid down, owing to the uncertain qualities of different oils. The effect to be produced is probably to partially saponify the oil, and too much alkali must not be used, or an insoluble mass will separate out and harden, defeating the object of the invention, which requires the "soap" to be dissolved and distributed in the mass.

I may employ any grade of heat, and do not confine myself to any particular method of applying it. Any of the well-known applications of heat by steam, hot air, or direct fire heat may be used.

I have not thought it necessary to exhibit any form of apparatus, as such forms no part of my invention, and as any well-known form of apparatus may be used.

The time of exposure to heat depends more or less on the quality of oil used and the quantity of alkali therein. If a small percentage of alkali be used, a longer heating will be required to produce the proper results, and in general the best results are obtained by a long heating. The viscosity of the product is, moreover, dependent upon the heat and time of heating, and if a relatively larger quantity of alkali be used the boiling-point of the mass is raised and the heat must be carefully graduated.

The viscosity of the product may be increased, if desired, by the addition of common rosin during or after the heating.

Some grades of oil will require more, some less, than the quantities of alkali I have mentioned, and these can only be found by experiments. I have used as high as ten per cent. of potash.

Rosin-oils thus treated acquire valuable properties, and are better adapted for use in various grades of printing-inks and paints. If the ordinary rosin-oil be used to make printing-inks and paints, the compound soon stiffens or hardens, especially with the latter when mineral pigments are employed, whereas the same mixed with my improved oil do not stiffen or harden, and are thereby of greater commercial value and capable of more extensive use.

The exact method of treatment and the steps taken in producing the results attained in my improved oil may be varied without departing from the spirit of my invention. For example, in manufacturing paints or inks, the alkaline salt may be first mixed or ground with the pigment and then added to the oil and heated as desired; or the mixture of pigment and alkaline salt may be made and no heat employed to hasten the result, which will be produced in time without artificial heating. Such variations I consider within my invention, and all others wherein the product contains the alkaline salt combined with or distributed and dissolved throughout the rosin-oil.

I am aware that the use of caustic soda or potash in the treatment of rosin-oil is not new for purifying or similar use, and where such purification requires the removal of the saponified matter.

So far as I am aware, no one has before produced, as a new and useful article of manufacture, rosin-oil containing the alkali in combination dissolved and distributed throughout the mass.

I claim and desire to secure by Letters Patent of the United States—

As a new article of manufacture, rosin-oil of commerce treated with and containing an alkaline salt of sodium or potassium in quantity sufficient to wholly or partially neutralize the resinous acids, substantially as and for the purpose set forth.

In testimony whereof I have hereunto set my hand in the presence of two subscribing witnesses.

DAVID J. OGILVY.

Witnesses:
R. M. HOSEA,
L. M. HOSEA.